US012505025B2

(12) United States Patent
Takeda

(10) Patent No.: US 12,505,025 B2
(45) Date of Patent: Dec. 23, 2025

(54) LOAD VERIFICATION SYSTEM AND LOAD VERIFICATION METHOD

(71) Applicant: Hitachi, Ltd., Tokyo (JP)

(72) Inventor: Shutaro Takeda, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 37 days.

(21) Appl. No.: 18/588,557

(22) Filed: Feb. 27, 2024

(65) Prior Publication Data

US 2024/0362147 A1 Oct. 31, 2024

(30) Foreign Application Priority Data

Apr. 27, 2023 (JP) ................................ 2023-073183

(51) Int. Cl.
  *G06F 13/42* (2006.01)
  *G06F 11/34* (2006.01)
(52) U.S. Cl.
  CPC ................................ *G06F 11/3485* (2013.01)
(58) Field of Classification Search
  None
  See application file for complete search history.

(56) References Cited

U.S. PATENT DOCUMENTS 11,036,554 B1 * 6/2021 Prock .................. G06F 9/45558
2016/0036632 A1 2/2016 Tanigawa et al.
2016/0306572 A1 * 10/2016 Ryan .................... G11C 16/349
2017/0206218 A1 * 7/2017 Jai ........................ G06F 16/2255
2020/0034057 A1 * 1/2020 Srinivasan ............ G06F 3/0604

FOREIGN PATENT DOCUMENTS

WO 2015/049771 A1 4/2015

* cited by examiner

*Primary Examiner* — Henry Tsai
*Assistant Examiner* — Dean Phan
(74) *Attorney, Agent, or Firm* — PROCOPIO, CORY, HARGREAVES & SAVITCH LLP

(57) ABSTRACT

There is provided a load verification system that performs load performance verification of a data storage area. The load verification system includes: a verification-purposed performance metrics collector that acquires performance metrics of the data storage area and a volume thereof that are load verification targets; an expected performance metrics data generator that generates performance metrics data that will be a result of a load, expected with respect to the load-verification-target volume; and an I/O pattern data generator that generates input/output pattern data based on which a load is generated that causes generation of performance metrics data whose performance is equivalent to expected performance indicated in the expected performance metrics data. An input/output pattern is reproduced by a reproduction section based on the data generated by the I/O pattern data generator, and performance metrics generated as a result of applying a load to the load-verification-target volume are collected.

6 Claims, 9 Drawing Sheets

FIG. 4

| # | DEVICE IDENTIFIER | VOLUME IDENTIFIER | COLLECTION TIME | PERFORMANCE METRICS DATA |
|---|---|---|---|---|
| 1 | ST01-000001 | 0001 | 2022-12-12T00:00:00.000 | 71,3,80,83,..., |
| 2 | ST02-000010 | 0001 | 2022-12-12T00:00:00.000 | 82,23,56,57,..., |
| ... | ... | ... | ... | ... |

FIG. 5

| # | DEVICE IDENTIFIER | VOLUME IDENTIFIER | COLLECTION TIME | I/O PATTERN DATA |
|---|---|---|---|---|
| 1 | ST01-000001 | 0001 | 2022-12-12T00:00:00.000 | 72,2,81,83,212 |
| 2 | ST02-000010 | 0001 | 2022-12-12T00:00:00.000 | 80,15,34,35,122 |
| ... | ... | ... | ... | ... |

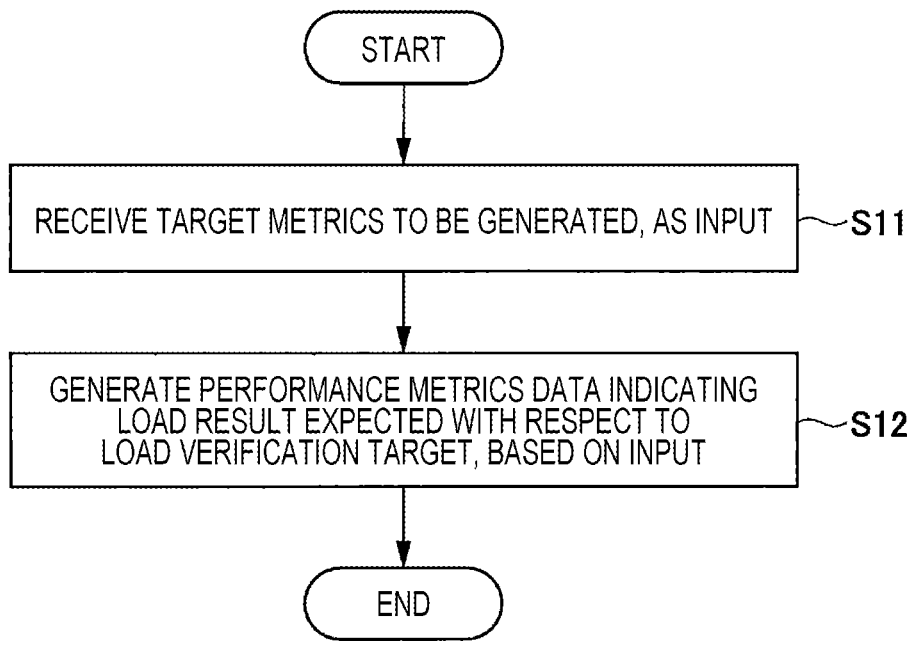
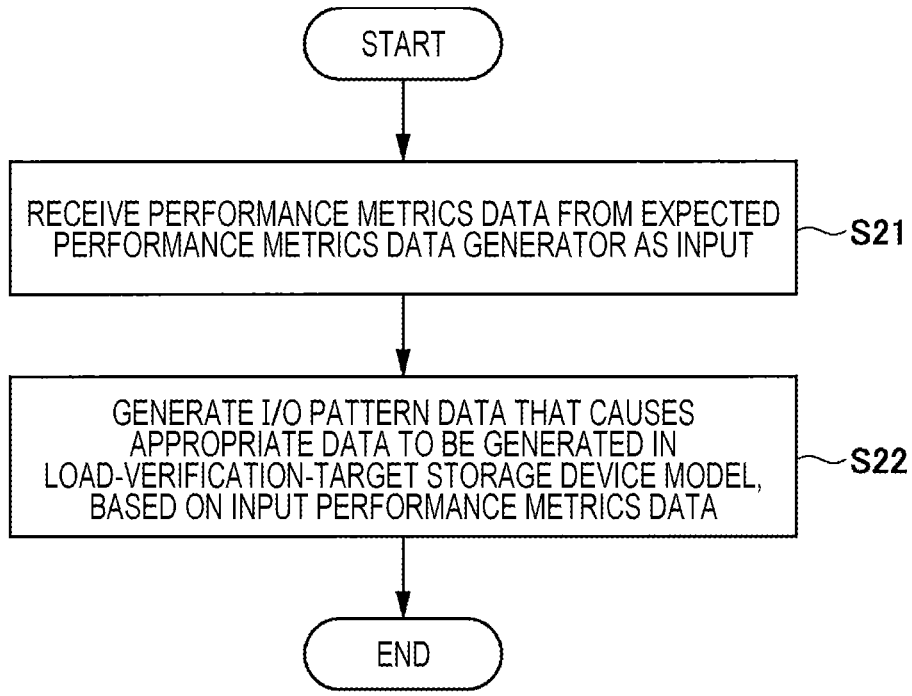

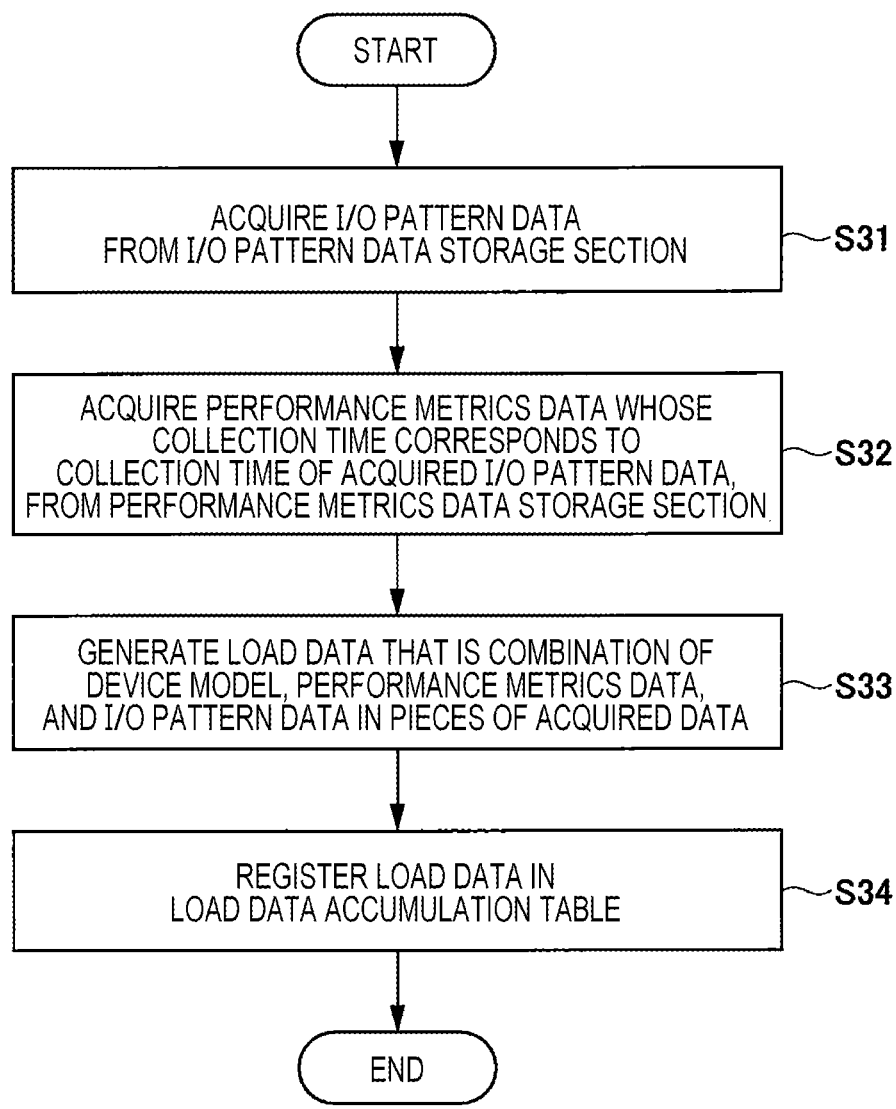

LOAD VERIFICATION SYSTEM AND LOAD VERIFICATION METHOD

The present application claims priority to Japanese Patent Application No. 2023-073183, filed on Apr. 27, 2023, the contents of which are incorporated herein by reference in their entirety.

BACKGROUND OF THE INVENTION

1. Field of the Invention

The present invention relates to a load verification system and a load verification method.

2. Description of the Related Art

When data stored in a storage system is migrated, it is common to verify the performance of a volume in advance under the actual environment of a migration destination. In this performance verification, a load made by input/output (I/O) of data has been applied to a volume created in a target storage system, whereby it has been confirmed whether requirements are satisfied as to influences on performance with respect to a volume after migration and on another operation (application) using a migration-destination storage device.

WO 2015/049771 A describes a technique for constructing an environment equivalent to the environment of a migration destination when load verification of the migration destination is performed.

SUMMARY OF THE INVENTION

A migration-destination target volume shares shared resources (a port, a processor, and the like) in its storage system with another volume used for other purposes. Thus, when a load is generated in the migration-destination target volume, the generated load has an influence on the performance of the other volume using the shared resources. Therefore, in data migration, it is necessary to verify an influence on the performance of other resources in a device as well as an influence on the performance of a target volume.

In the data migration, since tendencies match as to how volumes are used before and after the migration, a tendency in performance metrics indicating a result with respect to a load generated in a migration source also matches a tendency in performance metrics in a migration destination. Here, performance metrics that have been generated in a migration-source volume can be known in advance. That is, if I/O that causes specific performance metrics to be generated can be reproduced, a load equivalent to the load in the migration source can be reproduced with respect to the migration-destination volume. Thus, it is possible to verify an influence, when the load is generated, on the performance of another volume in a migration-destination device. However, in a case where there is a difference in device models (specifications) between a migration-source storage system and a migration-destination storage system, different values are exhibited for the respective models, in the performance metrics indicating the result of an influence on performance when exactly the same I/O is generated.

Conventionally, due to this aspect, in a case where there is a difference between a migration-source device model and a migration-destination device model, it has been hard to identify I/O that generates performance metrics expected with respect to a migration-destination volume. Thus, it has been hard to achieve reproduction. For this reason, in order to reproduce the tendency, it has been necessary to measure an influence on performance by applying a load to the migration-destination volume in a trial and error manner, to confirm an influence on the performance of another volume at a time when matching has occurred. Here, applying a load in a trial and error manner means, for example, applying a load by using an I/O pattern extracted randomly or based on a specific rule from accumulated load data.

The problems in the case of a storage system have been described above. However, even when different types of data storage systems, called a hybrid cloud solution as a whole, are combined, similar problems occur at the time of verification in data migration.

The present invention has been made in view of such problems, and it is an object of the present invention to provide a load verification system and a load verification method capable of appropriately performing verification in a short time when data stored in a storage system or the like is migrated.

In order to solve the above problems, for example, the configurations described in the claims are adopted.

The present application includes a plurality of means for solving the above problems, and an example thereof is a load verification system configured to perform load performance verification of a predetermined data storage area. The load verification system includes: a verification-purposed performance metrics collector configured to acquire performance metrics of the data storage area as a load verification target and a volume of the data storage area, as a load verification target; an expected performance metrics data generator configured to generate performance metrics data that will be a result of a load, expected with respect to the volume as the load verification target; and an I/O pattern data generator configured to generate input/output pattern data based on which a load is generated that causes generation of performance metrics data whose performance is equivalent to expected performance indicated in the expected performance metrics data.

Input/output to/from the volume as the load verification target are performed based on the input/output pattern data generated by the I/O pattern data generator, and the verification-purposed performance metrics collector collects performance metrics generated as a result of applying a load.

According to the present invention, it is possible to provide data having an input/output pattern that reproduces expected performance metrics with respect to a load-verification-target volume. Thus, a load generated in a migration-source environment can be reproduced in a migration destination, the verification period can be shortened, and an application service to be operated can be provided in a timely manner.

Problems, configurations, and effects other than those described above will be made apparent by the following description of an embodiment.

BRIEF DESCRIPTION OF THE DRAWINGS

FIG. 4 is a diagram illustrating an example of a format of performance metrics data according to the embodiment of the present invention;

FIG. 5 is a diagram illustrating an example of a format of I/O pattern data according to the embodiment of the present invention;

FIG. 7 is a flowchart illustrating an example of processing executed by an expected performance metrics data generator according to the embodiment of the present invention;

FIG. 8 is a flowchart illustrating an example of processing executed by the I/O pattern data generator according to the embodiment of the present invention;

FIG. 9 is a flowchart illustrating an example of processing executed by a load data generator according to the embodiment of the present invention;

DESCRIPTION OF THE PREFERRED EMBODIMENT

Hereinafter, a load verification system according to an embodiment (hereinafter, referred to as "present embodiment") of the present invention will be described with reference to the accompanying drawings.

[Configuration of Load Verification System]

Figure 1:
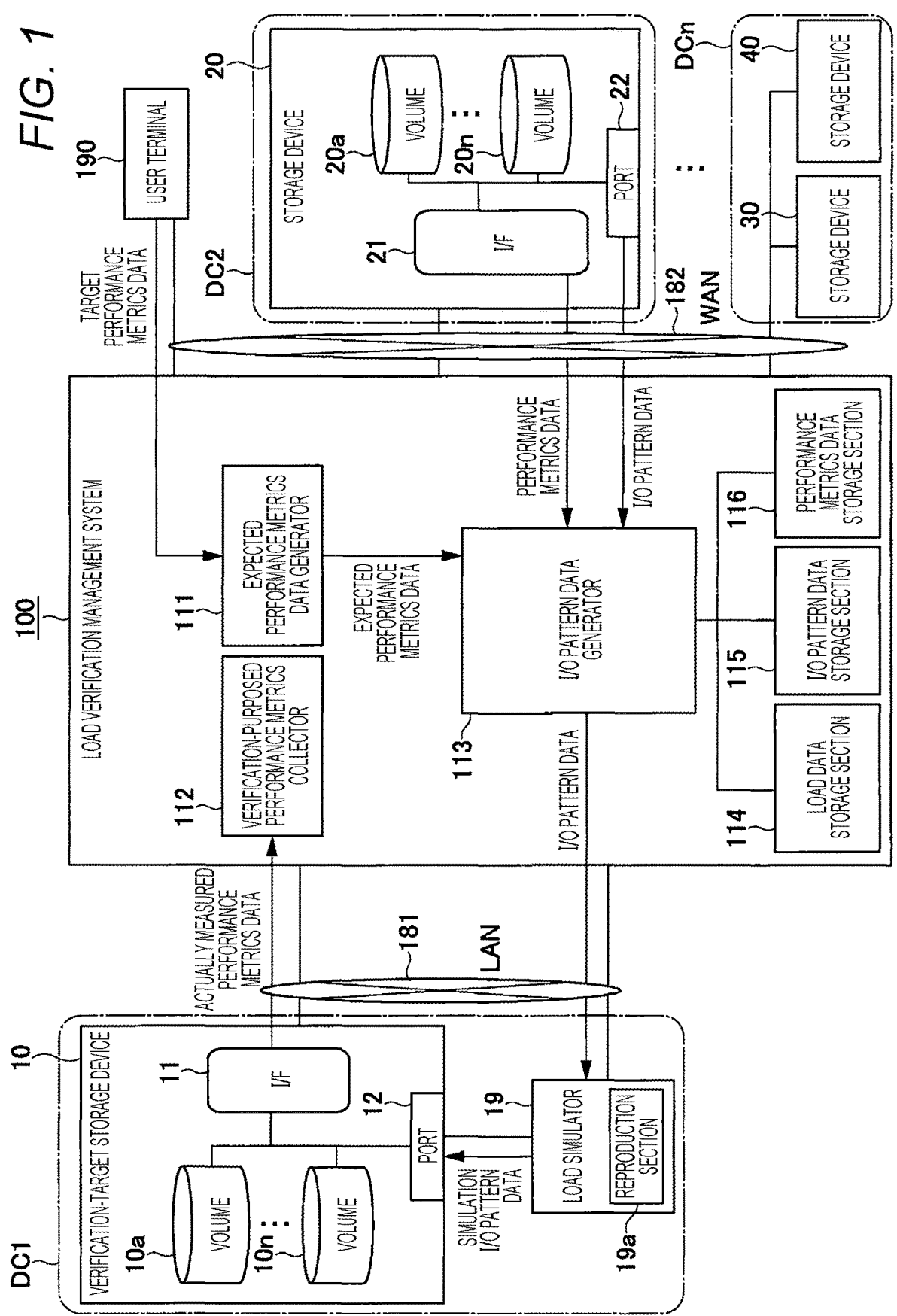
FIG. 1 is a configuration diagram illustrating an example of an overall configuration of a load verification system according to an embodiment of the present invention.

FIG. 1 illustrates an overall configuration of the load verification system according to the present embodiment.

The load verification system according to the present embodiment includes a load verification management system 100 and a load simulator 19, and is configured to perform verification of a verification-target storage device 10 installed in a data center DC1. The verification-target storage device 10 is a migration destination of data.

The verification-target storage device 10 includes a plurality of volumes 10a to 10n (n is any integer), and each of the volumes 10a to 10n has a predetermined data storage area. The load simulator 19 is installed in the data center DC1.

The verification-target storage device 10 includes an interface 11 and a port 12, and simulation input/output pattern data from a reproduction section 19a of the load simulator 19 is supplied to the verification-target volumes 10a to 10n via the port 12. Note that the input/output pattern data and input/output data are referred to as I/O pattern data and I/O data, respectively, in the following description.

Performance metrics data actually measured in each of the volumes 10a to 10n is transmitted from the interface 11 to the load verification management system 100 via a predetermined local area network (LAN) 181.

As the performance metrics data of a storage (volume), there are various types of data indicating the performance of a relevant storage, and for example, there are read throughput, write throughput, the number of operations of read requests per unit time, the number of operations of write requests per unit time, read latency, write latency, a usage rate, and the like. These performance metrics change depending on an environment in which a device (storage) that is a data storage area is installed as well as the performance of the device (storage) itself.

The load verification management system 100 receives, as input, target performance metrics data from a user terminal 190 which is an external terminal, then generates I/O pattern data, and supplies the generated I/O pattern data to the load simulator 19. The load simulator 19 applies, based on the data, a load using simulation I/O pattern data to a verification-target volume. Then, the load verification management system 100 collects performance metrics data actually measured when the load is applied by the load simulator 19, and performs load verification.

In addition, a plurality of (a large number of) storage devices 20, 30, 40, . . . that are storage devices as migration sources of data are connected to the load verification management system 100 via a network. For example, the storage device 20 installed in a data center DC2 and the storage devices 30, 40 installed in a data center DCn (n is any integer) or the like are connected to the load verification management system 100 via a wide area network (WAN) 182, and the load verification management system 100 collects performance metrics data from each storage device. The plurality of storage devices 20, 30, 40, . . . are storage devices of different types. Alternatively, even if the storage devices are the same type, the storage devices are desirably installed in different environments.

A specific configuration of the load verification management system 100 will be described. The load verification management system 100 includes an expected performance metrics data generator 111, a verification-purposed performance metrics collector 112, an I/O pattern data generator 113, a load data storage section 114, an I/O pattern data storage section 115, and a performance metrics data storage section 116.

The expected performance metrics data generator 111 generates expected performance metrics data based on the target performance metrics data input from the user terminal 190. In the user terminal 190, there are a case in which the performance metrics data is obtained by user's input, and a case in which the performance metrics data is obtained automatically by using a program implemented in the user terminal 190.

The expected performance metrics data generated in the expected performance metrics data generator 111 is supplied to the I/O pattern data generator 113.

The verification-purposed performance metrics collector 112 collects performance metrics data transmitted from the verification-target storage device 10 in the data center DC1 via the LAN 181.

The I/O pattern data generator 113 generates and outputs I/O pattern data that matches the expected performance metrics data, by using data stored in the load data storage section 114, the I/O pattern data storage section 115, and the performance metrics data storage section 116. A detailed configuration for generating the I/O pattern data will be described later with reference to FIG. 2.

The I/O pattern data output from the I/O pattern data generator 113 is supplied to the load simulator 19 via the LAN 181.

In the load simulator 19, the reproduction section 19a generates simulation I/O pattern data based on the I/O pattern data supplied from the I/O pattern data generator 113. The simulation I/O pattern data generated by the reproduction section 19a is supplied to the verification-target volumes 10a to 10n via the port 12.

[Configuration of I/O Pattern Data Generator]

Figure 2:
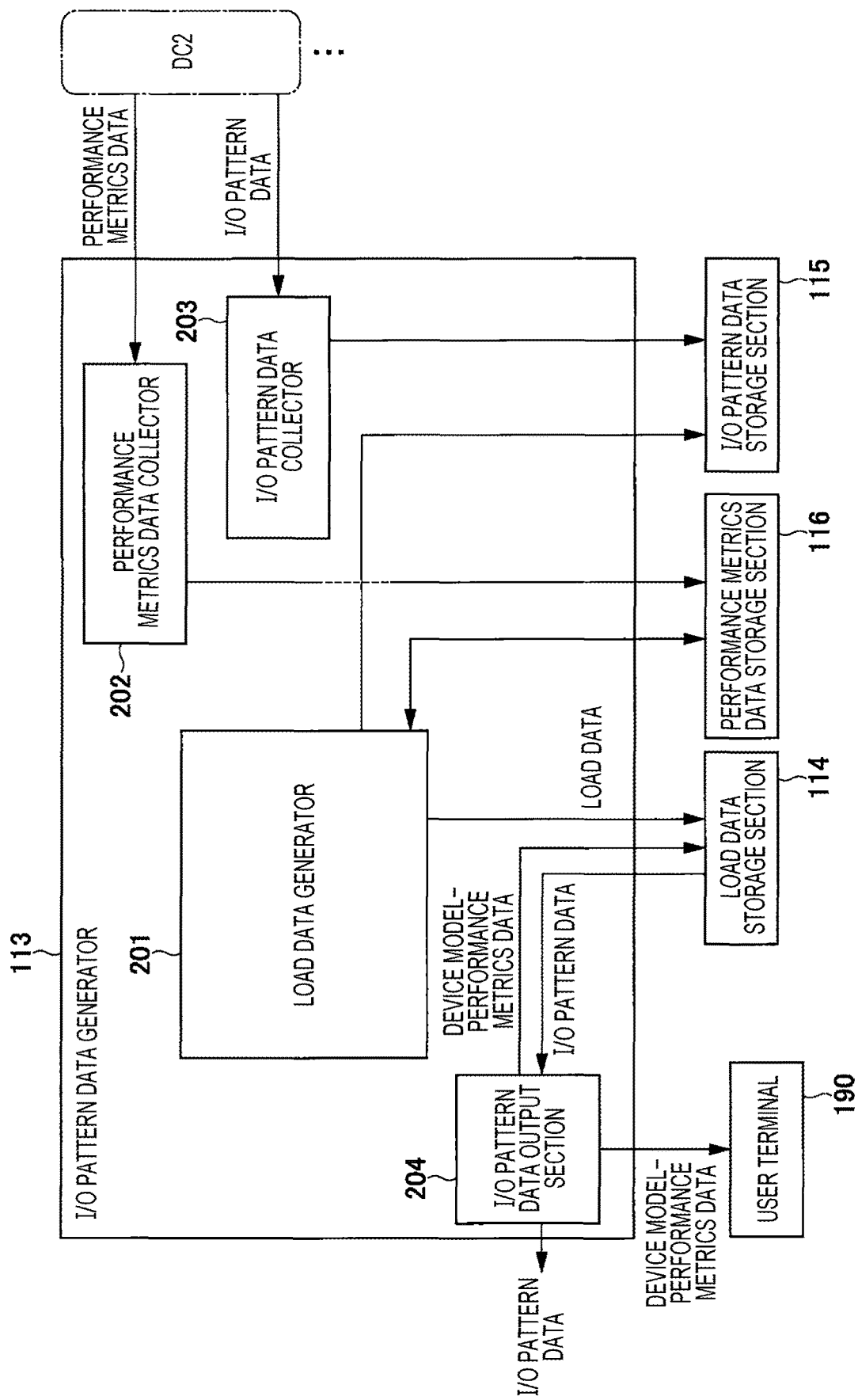
FIG. 2 is a block diagram illustrating an example of a configuration of an I/O pattern data generator according to the embodiment of the present invention.

FIG. 2 illustrates a configuration of the I/O pattern data generator 113.

The I/O pattern data generator 113 includes a load data generator 201, a performance metrics data collector 202, an I/O pattern data collector 203, and an I/O pattern data output section 204.

The performance metrics data collector 202 collects performance metrics data from a storage device that is a migration source of data. The I/O pattern data collector 203 collects I/O pattern data from a storage device that is a migration source of data. The example of FIG. 2 illustrates an example in which the performance metrics data and the I/O pattern data are collected from the storage device 20 installed in the data center DC2. However, from the storage devices 30, 40, and the like installed in the data center of another environment, the performance metrics data collector 202 and the I/O pattern data collector 203 also respectively collect the performance metrics data and the I/O pattern data.

The pieces of performance metrics data of the plurality of storage devices collected by the performance metrics data collector 202 are stored in the performance metrics data storage section 116.

FIG. 4 illustrates an example of a format of pieces of performance metrics data that are collected by the performance metrics data collector 202 and that are stored in the performance metrics data storage section 116.

In the performance metrics data stored in the performance metrics data storage section 116, a combination of a device identifier indicating a storage device configuration, a target volume identifier, a time at which the data has been collected, and actually measured performance metrics data is set as one record.

The pieces of I/O pattern data of the plurality of storage devices collected by the I/O pattern data collector 203 are stored in the I/O pattern data storage section 115.

The performance metrics data stored in the performance metrics data storage section 116 and the I/O pattern data stored in the I/O pattern data storage section 115 are read by the load data generator 201.

FIG. 5 illustrates an example of a format of pieces of I/O pattern data that are collected by the I/O pattern data collector 203 and that are stored in the I/O pattern data storage section 115.

In the I/O pattern data stored in the I/O pattern data storage section 115, a combination of a device identifier indicating a storage device configuration, a target volume identifier, a time at which the data has been collected, and actually measured I/O pattern data is set as one record.

Returning to the description of FIG. 2, the load data generator 201 maps each piece of stored data, generates load data, and stores the generated load data in the load data storage section 114. When the load data generator 201 generates the load data, the load data generator 201 acquires I/O pattern data from the I/O pattern data storage section 115, and acquires performance metrics data whose collection time corresponds to the collection time of the acquired I/O pattern data, from the performance metrics data storage section 116. Then, the load data generator 201 generates load data that is a combination of the pieces of acquired data, and stores the generated load data in the load data storage section 114.

Figure 6:
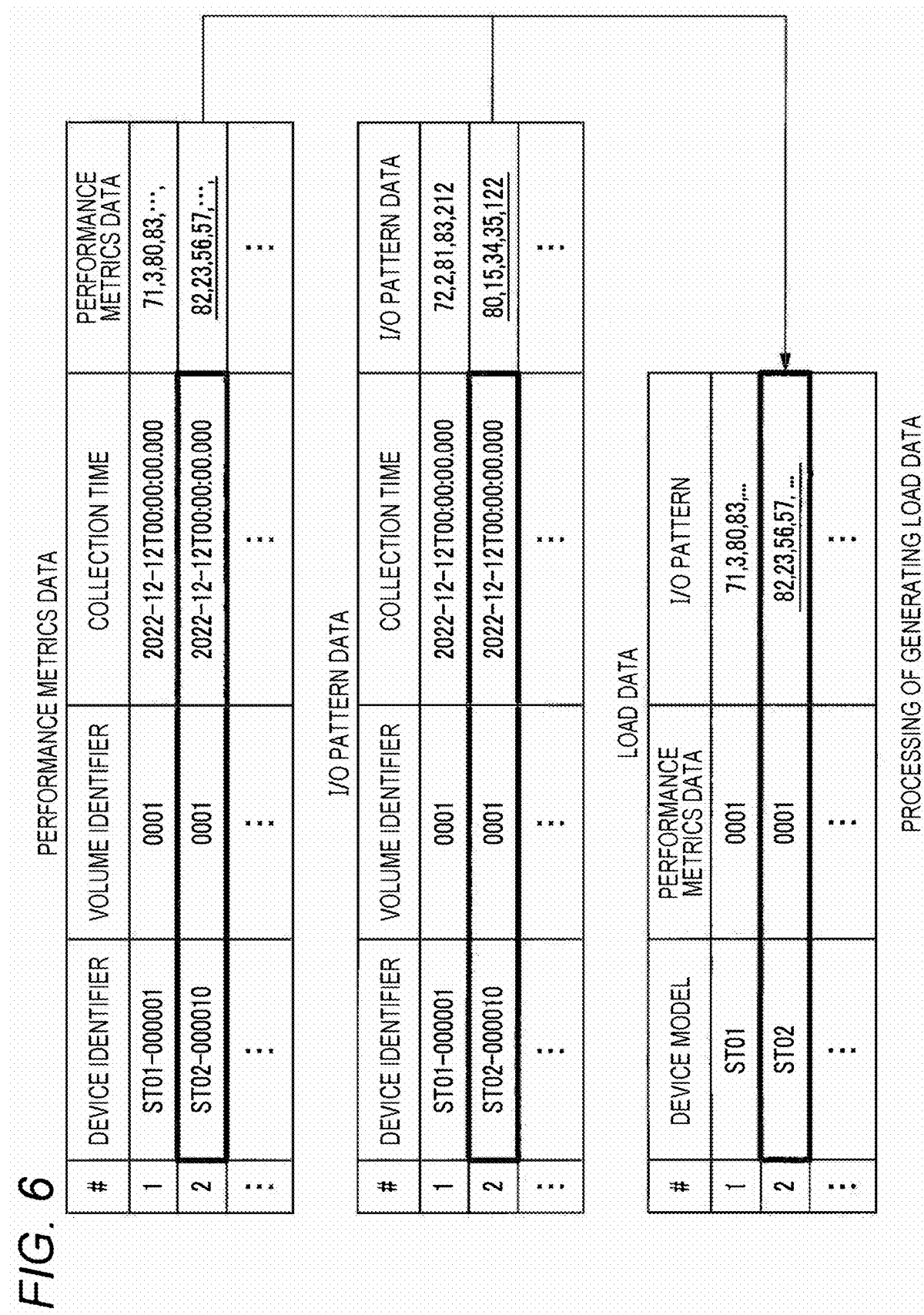
FIG. 6 is a diagram illustrating an example of processing of generating load data according to the embodiment of the present invention.

FIG. 6 illustrates an example of a state of processing in which the load data generator 201 generates load data.

From the table prepared in the performance metrics data storage section 116 and the table prepared in the I/O pattern data storage section 115, the load data generator 201 sets, as mapping targets, records between which respective values of "device identifier—volume identifier—collection time" are the same. Then, the load data generator 201 generates load data organized by setting "device configuration-performance metrics data—I/O pattern data" of appropriate mapping targets as one record, and stores the generated load data in a table in the load data storage section 114.

Returning again to the description of FIG. 2, the I/O pattern data output section 204 searches the load data storage section 114 for data stored therein based on input, from the user terminal 190, indicating a combination of a device configuration and performance metrics data. Then, the I/O pattern data output section 204 reads appropriate I/O pattern data, and outputs the I/O pattern data to the load simulator 19 (see FIG. 1).

[Example of Hardware Configuration of Load Verification Management System]

Figure 3:
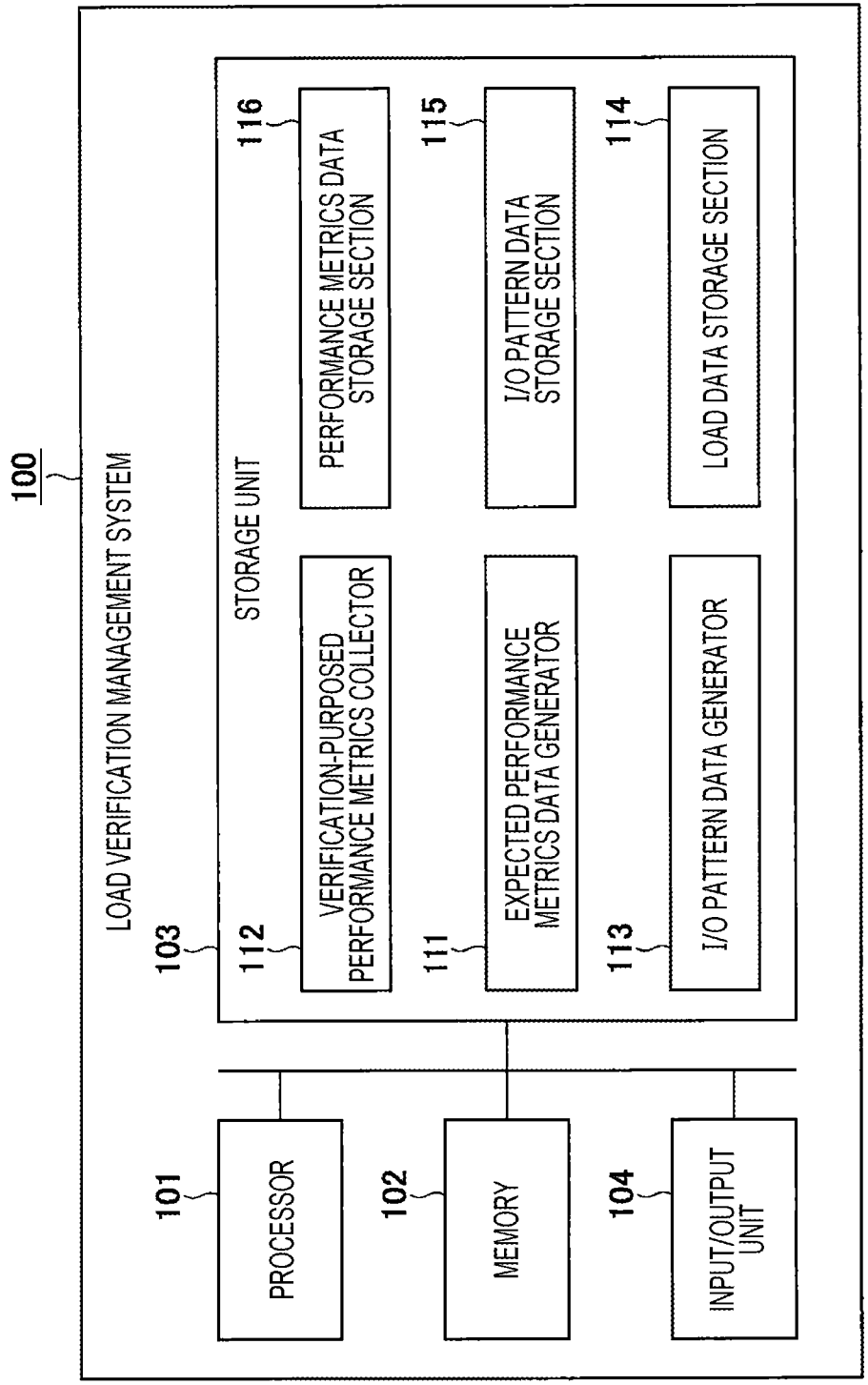
FIG. 3 is a block diagram illustrating an example of a configuration of a load verification management system according to the embodiment of the present invention.

FIG. 3 illustrates an example of a hardware configuration of the load verification management system 100.

The configuration of the load verification management system 100 illustrated in FIG. 3 is an exemplary case of a configuration in which the load verification management system 100 includes a computer.

That is, the load verification management system 100 including a computer includes a processor 101, a memory 102, a storage unit 103, and an input/output unit 104, and the components are connected via a bus line whereby data can be transferred mutually between the components.

Then, the processor 101 executes a program stored in the storage unit 103 to cause the expected performance metrics data generator 111, the verification-purposed performance metrics collector 112, and the I/O pattern data generator 113 to be configured in the storage unit 103. In addition, the load data storage section 114, the I/O pattern data storage section 115, and the performance metrics data storage section 116 are configured by using part of the storage area of the storage unit 103.

Note that the case in which the load verification management system 100 includes the computer including the processor 101 is an example, and another configuration may be adopted. For example, part or all of the load verification management system 100 may be implemented by dedicated hardware such as a field programmable gate array (FPGA) or an application specific integrated circuit (ASIC).

Alternatively, the load verification management system 100 may be a so-called cloud computer prepared on a server accessible via the Internet or the like. In this case, each storage section such as the load data storage section 114 is also stored on the server. Alternatively, each storage section such as the load data storage section 114 may be provided on a server, and a computer included in the load verification management system 100 may read storage data from the server to perform management processing on load verification.

[Processing Executed by Expected Performance Metrics Data Generator]

FIG. 7 is a flowchart illustrating an example of processing executed by the expected performance metrics data generator 111.

First, the expected performance metrics data generator 111 receives target metrics to be generated, from the user terminal 190 as input (step S11).

Then, the expected performance metrics data generator 111 executes expected performance metrics data generation processing of generating performance metrics data indicating a load result expected with respect to a load verification target, based on the received input (step S12). The performance metrics data generated in step S12 is supplied to the I/O pattern data generator 113.

[Processing Executed by I/O Pattern Data Generator]

FIG. 8 is a flowchart illustrating an example of processing executed by the I/O pattern data generator 113.

The I/O pattern data generator 113 receives the expected performance metrics data supplied from the expected performance metrics data generator 111 as input (step S21).

Then, the I/O pattern data generator 113 executes I/O pattern data generation processing of generating I/O pattern data that causes appropriate performance metrics data to be generated in a load-verification-target storage system, based on the received performance metrics data (step S22). That is, the I/O pattern data generator 113 generates this I/O pattern data by retrieving I/O pattern data based on which performance metrics data equivalent to the expected performance metrics data is generated, from among various pieces of load data stored in the load data storage section 114.

[Processing Executed by Load Data Generator]

FIG. 9 is a flowchart illustrating an example of processing executed by the load data generator 201.

The load data generator 201 acquires I/O pattern data from the I/O pattern data storage section 115 (step S31). Then, the load data generator 201 acquires performance metrics data whose collection time corresponds to the collection time of the I/O pattern data acquired in step S31, from the performance metrics data storage section 116 (step S32).

Subsequently, the load data generator 201 generates load data that is a combination of the pieces of acquired data (step S33). Thereafter, the load data generator 201 registers (stores) the load data generated in Step S33 in the load data storage section 114 (Step S34).

[Processing Executed by Load Simulator]

Figure 10:
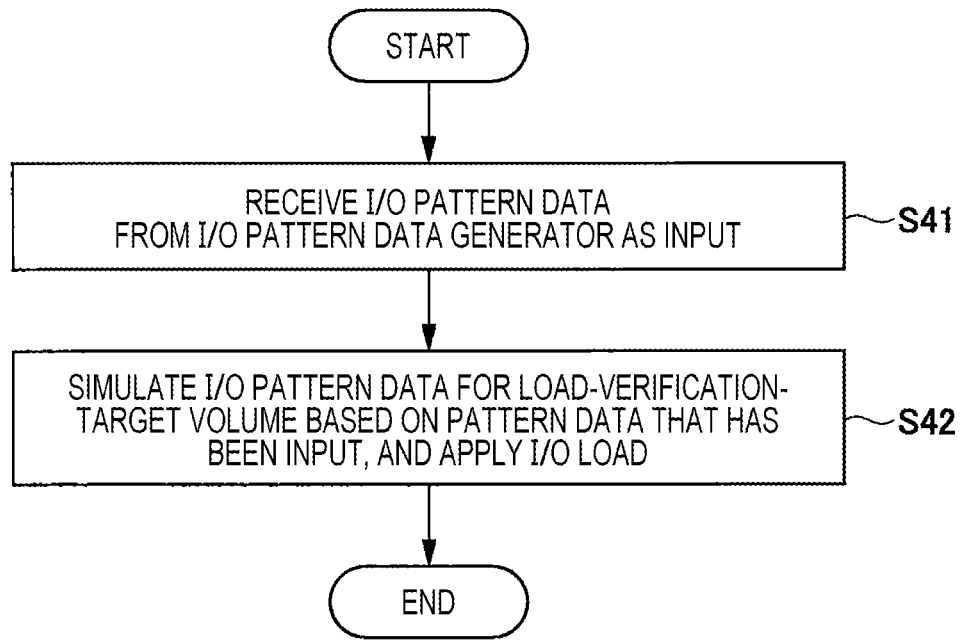
FIG. 10 is a flowchart illustrating an example of processing executed by a load simulator according to the embodiment of the present invention.

FIG. 10 is a flowchart illustrating an example of processing executed by the reproduction section 19a of the load simulator 19.

The load simulator 19 receives the I/O pattern data transmitted from the I/O pattern data generator 113 as input (step S41). Then, the reproduction section 19a of the load simulator 19 simulates an I/O pattern for a load-verification-target volume based on the pattern data that has been input, and executes processing of applying input and output loads (step S42).

[Processing Executed by Verification-Purposed Performance Metrics Collector]

Figure 11:
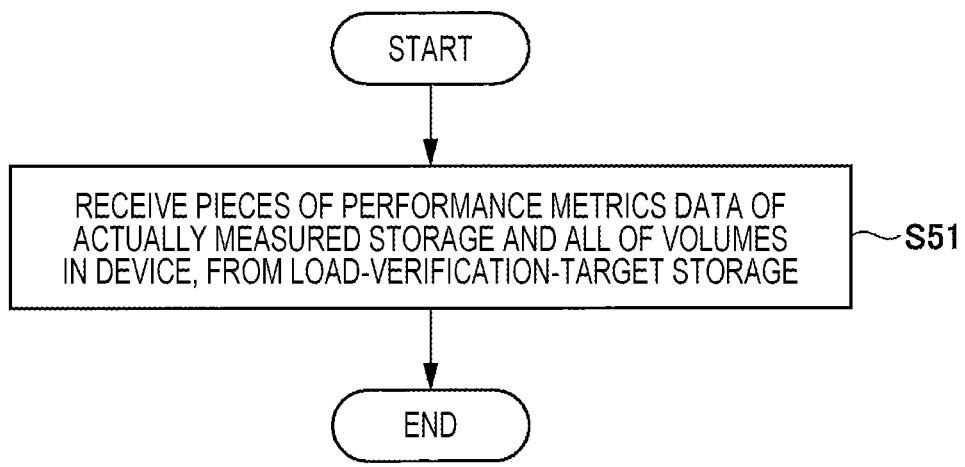
FIG. 11 is a flowchart illustrating an example of processing executed by a verification-purposed performance metrics collector according to the embodiment of the present invention.

FIG. 11 is a flowchart illustrating an example of processing executed by the verification-purposed performance metrics collector 112.

The verification-purposed performance metrics collector 112 executes verification-purposed performance metrics collection processing of receiving pieces of performance metrics data of the actually measured storage system and all of the volumes in the storage device 10, from the load-verification-target storage device 10 (step S51).

The load verification management system 100 compares the performance metrics data received by the verification-purposed performance metrics collector 112 and the expected performance metrics data generated by the expected performance metrics data generator 111, to verify whether the storage device 10 exhibits the expected performance. The result of the verification is displayed on the user terminal 190, for example.

[Effects Produced by Load Verification System]

As described above, according to the load verification system of the present embodiment, it is possible to provide data having an input/output pattern that reproduces expected performance metrics with respect to a load-verification-target volume. Thus, a load generated in a migration-source environment can be reproduced in a migration destination, the verification period can be shortened, and an application service to be operated can be provided in a timely manner.

That is, conventionally, in a case where there is a difference in models between a migration-source storage device and a migration-destination storage device, it has been hard to identify I/O pattern data that generates performance metrics expected with respect to a migration-destination volume. Thus, it has been hard to achieve reproduction. For this reason, conventionally, in order to reproduce a tendency, an influence on performance has been measured by applying a load to the migration-destination volume in a trial and error manner using I/O pattern data extracted randomly or based on a specific rule from accumulated load data. Then, an influence on the performance of another volume at a time when matching has occurred has been confirmed.

In contrast, in the case of the load verification system of the present embodiment, combinations each of which includes performance metrics data and I/O pattern data are collected in advance from the plurality of storage devices 20, 30, 40, . . . that are different types or that are installed in different environments. Then, I/O pattern data matching expected performance is retrieved to perform simulation in the verification-target storage device 10.

Thus, according to the load verification system of the present embodiment, it is possible to shorten a time of I/O load verification, which has been conventionally performed by using a large number of test patterns. Therefore, it is possible to obtain an effect of shortening the verification period.

In the case of the load verification system of the present embodiment, the load verification management system 100 includes the load data storage section 114, the I/O pattern data storage section 115, and the performance metrics data storage section 116, to allow I/O pattern data matching expected performance to be extracted from load data. Thus, it is possible to verify various types of expected performance.

Modifications

Note that the embodiment described up to here has been described in detail for easy understanding of the present invention. Therefore, the present invention is not necessarily limited to those including all the configurations described therein.

For example, in the embodiment described above, a storage device installed in a data center is used as a device including a verification-target data storage area. However, alternatively, data storage areas of predetermined volumes provided in a cloud solution or a hybrid cloud solution may be used for verification. That is, in a case where data storage areas prepared in various devices such as servers connected via the Internet or the like are used as a predetermined number of volumes, that is, as data storage areas, the volumes may be used as verification targets.

In this case, the storage devices 20, 30, 40, . . . from which performance metrics data and I/O pattern data are collected may also be configured as volumes provided in the cloud solution or the hybrid cloud solution.

Further, the load simulator 19 is desirably installed at the same location as the location where the storage device 10 is installed to supply simulation I/O pattern data, in a case where the storage device 10 installed in the data center is verified as illustrated in FIG. 1. However, alternatively, the load simulator 19 may be provided at a location different from a location where a data storage area is installed.

Further, in the embodiment described above, the I/O pattern data generator 113 causes pieces of I/O pattern data, based on which various performance metrics are generated, to be stored by collecting them from the plurality of storage devices 20, 30, 40, and obtains I/O pattern data that achieves equivalent performance from among the pieces of stored data. However, alternatively, the I/O pattern data generator 113 may generate I/O pattern data corresponding to expected performance metrics through certain arithmetic processing.

Further, in the embodiment described above, the processing has been described until the verification-purposed performance metrics collector 112 collects performance metrics generated as a result of applying a load. However, alternatively, the load verification management system 100 may perform verification based on the collected data. Alternatively, the collected performance metrics may be transmitted to the user terminal 190 to be subjected to verification by the user terminal 190 side.

Further, in the diagrams of the configurations illustrated in FIGS. 1 to 3, the control lines and the information lines considered to be minimally necessary for the description are illustrated. Therefore, all the control lines and all the information lines for the product may not necessarily be illustrated. In practice, it may be considered that almost all the components are connected to one another.

Further, each of the flows of the pieces of processing illustrated in the flowcharts in FIGS. 7 to 11 is also an example. Thus, in a case where the processing results are the same, a part of the order in the processing may be changed, or a plurality of pieces of processing may be executed simultaneously.

Further, the load verification management system 100 described in the embodiment can be configured by implementing a program for load verification management on a general computer as described with reference to FIG. 3. As well as being prepared in a storage unit in the computer, the program for implementing each processing function in this case may be stored in a recording medium such as an external memory, an IC card, an SD card, or an optical disk to be transferred.

What is claimed is:

1. A load verification management system comprising:
a processor; and
a storage unit,
wherein the processor:
collects, from each of a plurality of first storage devices, I/O pattern data supplied to a resource included in the first storage device, and performance metrics data actually-measured in the resource with respect to the supplied I/O pattern data, each piece of a collected plurality of the I/O pattern data and the performance metrics data having been added with device information identifying the first storage device, resource information identifying resources, and a collection time at which data is collected,
sequentially stores the I/O pattern data, added with the device information, the resource information, and the collection time, in an I/O pattern data storage section of the storage unit,
sequentially stores the performance metrics data, added with the device information, the resource information, and the collection time, in a performance metrics data storage section of the storage unit,
refers to the I/O pattern data storage section and the performance metrics data storage section, and retrieves records in which respective values of the device information, the resource information, and the collection time are the same,
sets, as mapping targets, the retrieved records of the I/O pattern data storage section and records of the performance metrics data storage section, and generates a plurality of pieces of load data in which the device information, the I/O pattern data, and the performance metrics data are associated,
stores the generated plurality of pieces of load data in a load data storage section of the storage unit,
retrieves the load data storage section using the device information and the performance metrics data as input,
reads out first I/O pattern data from the retrieved load data, and
outputs read-out first I/O pattern data to a load simulator for applying a load of inputting and outputting to a resource of a second storage device as a load verification target.

2. The load verification management system according to claim 1, wherein the processor:
retrieves the load data storage section using, as input, performance metrics data indicating a result of a load expected with respect to the resource of the second storage device,
reads out second I/O pattern data from the retrieved load data, and
outputs the read-out second I/O pattern data to the load simulator for applying a load of inputting and outputting to a resource of the second storage device.

3. The load verification management system according to claim 2, wherein
the first storage device is a migration-source storage device of data, and the second storage device is a migration-destination storage device of data, and
the resource is a volume.

4. A load verification management method in a load verification management system,
the load verification management system comprising a processor, and a storage unit, and
the method performing, with the processor:
collecting, from each of a plurality of first storage devices, I/O pattern data supplied to a resource included in the first storage device, and performance metrics data actually-measured in the resource with respect to the supplied I/O pattern data, each piece of a collected plurality of the I/O pattern data and the performance metrics data having been added with device information identifying the first storage device, resource information identifying resources, and a collection time at which data is collected,
sequentially storing the I/O pattern data, added with the device information, the resource information, and the collection time, in an I/O pattern data storage section of the storage unit,
sequentially storing the performance metrics data, added with the device information, the resource information, and the collection time, in a performance metrics data storage section of the storage unit,
referring to the I/O pattern data storage section and the performance metrics data storage section, and retrieving records in which respective values of the device information, the resource information, and the collection time are the same, setting, as mapping targets, the retrieved records of the I/O pattern data storage section and records of the performance metrics data storage section, and generating a plurality of pieces of load data in which the device information, the I/O pattern data, and the performance metrics data are associated, storing the generated plurality of pieces of load data in a load data storage section of the storage unit, retrieving the load data storage section using the device information and the performance metrics data as input, reading out first I/O pattern data from the retrieved load data, and outputting read-out first I/O pattern data to a load simulator for applying a load of inputting and outputting to a resource of a second storage device as a load verification target.

5. The load verification management method according to claim 4, the method performing, with the processor, retrieving the load data storage section using, as input, performance metrics data indicating a result of a load expected with respect to the resource of the second storage device, reading out second I/O pattern data from the retrieved load data, and outputting the read-out second I/O pattern data to the load simulator for applying a load of inputting and outputting to a resource of the second storage device.

6. The load verification management method according to claim 5, wherein the first storage device is a migration-source storage device of data, and the second storage device is a migration-destination storage device of data, and the resource is a volume.

* * * * *